M. M. McINTYRE.
VEHICLE SPRING.
APPLICATION FILED AUG. 28, 1909.
1,018,250.
Patented Feb. 20, 1912.
2 SHEETS—SHEET 1.
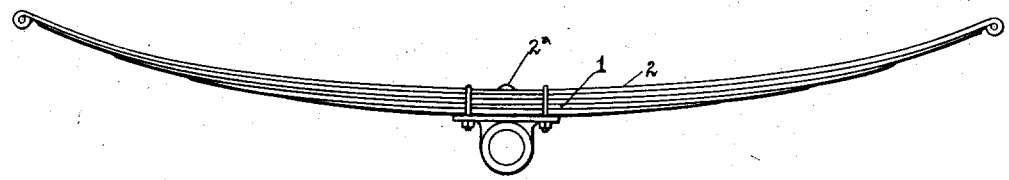
Fig. 1
Fig. 2
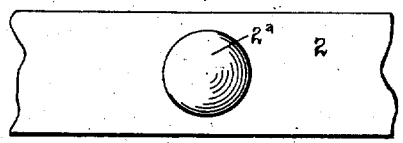
Fig. 4
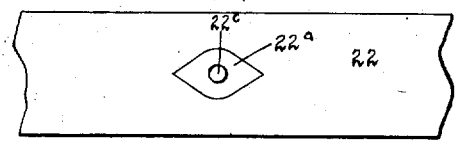
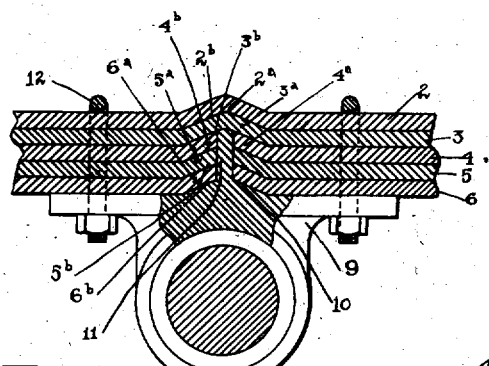
Fig. 3
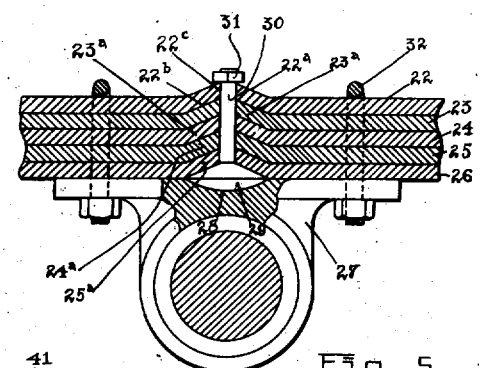
Fig. 5
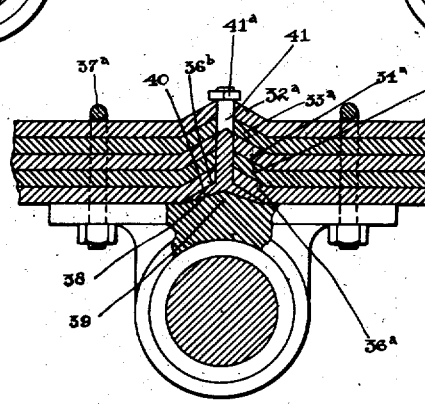
Fig. 6
Witnesses:
Brennan B. West
Chas. C. Watt
Inventor
Michael M. McIntyre
By Bates, Fouts & Hull
Attys.

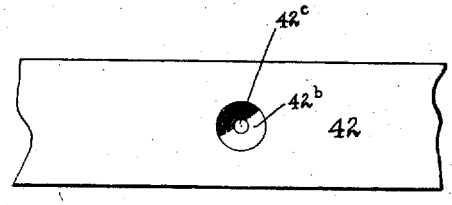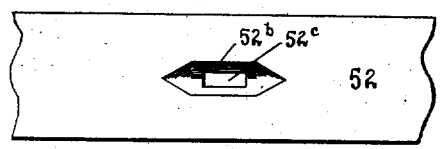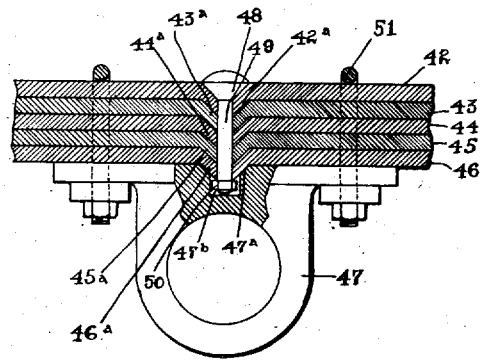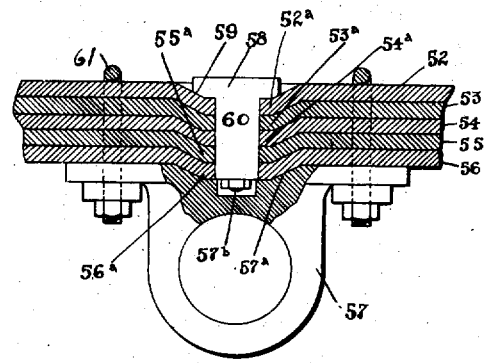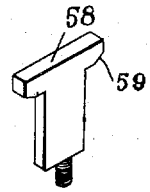

UNITED STATES PATENT OFFICE.

MICHAEL M. McINTYRE, OF CLEVELAND, OHIO, ASSIGNOR TO THE PERFECTION SPRING COMPANY, OF CLEVELAND, OHIO, A CORPORATION OF OHIO.

VEHICLE-SPRING.

1,018,250. Specification of Letters Patent. Patented Feb. 20, 1912.

Application filed August 28, 1909. Serial No. 515,117.

*To all whom it may concern:*

Be it known that I, MICHAEL M. McINTYRE, a citizen of the United States, residing at Cleveland, in the county of Cuyahoga and State of Ohio, have invented a certain new and useful Improvement in Vehicle-Springs, of which the following is a full, clear, and exact description, reference being had to the accompanying drawings.

This invention relates to vehicle springs and to a construction, including a special form of spring seat, whereby the leaves of a multiple-leaf spring may be secured together in such manner as to relieve the center bolt of shearing strains due to any movement of the spring leaves, and even enable the center bolt to be dispensed with except as a temporary connector for the leaves.

A further object of the invention is to provide a special construction of spring, seat and bolt which, while securing the above result, will strengthen the seat at what is ordinarily the weakest point.

Generally speaking, the invention may be defined as consisting of the combinations of elements embodied in the claims hereto annexed and illustrated, in five exemplifications, in the drawing forming part hereof, wherein—

Figure 1 represents a side elevation of a spring constructed in accordance with my invention; Fig. 2 represents a top plan view of one of the leaves of such spring; Fig. 3 is a sectional detail taken through the central portion of the spring and the spring seat; Figs. 4 and 5 are views, similar to Figs. 2 and 3, respectively, of a modified form of the invention shown in the former figures; Fig. 6 is a view, similar to Fig. 3, of another modification of the invention; Figs. 7 and 8 are views, similar to Figs. 2 and 3, respectively, of a further modified form of my invention; Figs. 9 and 10, are views, similar to Figs. 2 and 3, of a still further modified form of my invention, and Fig. 11 is a perspective detail of the bolt shown in Fig. 10.

Describing the parts by reference characters, 1 represents a spring, which is shown as a plain semi-elliptic spring comprising a plurality of leaves, the main leaf or plate being shown at 2 and the other leaves being shown at 3, 4, 5, and 6. As a means for centering the spring leaves for assembling, I provide each leaf with a central projection, as shown at $2^a$, $3^a$, $4^a$, $5^a$ and $6^a$. This projection is formed by punching the central portion of each leaf away from the seat which the spring is to occupy. By this manner of forming the projections, it follows that concavities or recesses $2^b$, $3^b$, $4^b$, etc., are provided, corresponding and complementary to the projections or convexities. The spring plates are punched in such manner as not to materially reduce the thickness of the stock at the deflected portions thereof, and the projection of one plate nests within the concavity of the next plate, as appears more particularly from Fig. 3. The central portions of some of the projections thus formed are perforated for the reception of the center bolt. A convenient manner of forming the apertures is by punching through the central portions of the projections, thus forming apertures of sufficient diameter to receive the bolt. These apertures may be formed when the projections are struck from the leaves and preferably by the same operation. I prefer to perforate only the leaves which will be nearest the spring-seat, three such leaves being shown as perforated, viz: leaves 4, 5 and 6.

9 denotes the spring seat. This seat is of standard construction except that the upper surface is provided with a projection 10, having a short integral bolt 11. The projection 10 conforms in contour to the recess in leaf 6 and the bolt 11 is of such length as to extend through the perforations in the leaves 4, 5 and 6. Clips 12 are provided for the purpose of securing the spring as a whole to the spring seat.

By the construction described and illustrated, it will be seen that each shorter leaf is provided with a projecting seat for the next longer leaf and that the spring seat is provided with a projecting tapered seat for the recess in the shortest leaf or "short plate". By this construction, the bolt 11 is relieved of all shear of the spring plates, the bolt serving merely to facilitate centering the plates. All shear of the uppermost plate 2 is taken by the next plate 3. All shear of the plate 3 is taken by the plate 4, and so on, the shear of the lowermost or shortest plate being taken by the spring seat. It follows that no shearing strain whatever is exerted upon the shank of the bolt, such strain being transmitted to the inclined seating projection of the spring seat.

In Figs. 4 and 5, there is shown a modification of my invention which resembles the embodiment shown in Figs. 2 and 3, but differs therefrom mainly in having a bolt separate from the spring seat and of a length to extend through all of the spring leaves, with a special form of recess in the spring seat to accommodate the bolt head. In this embodiment, 22 denotes the main plate or leaf. This leaf is provided with a projection 22$^a$ similar to the projection 2$^a$ and provided with a complementary recess 22$^b$ and a central aperture 22$^c$. The recess 22$^b$ receives the projection 23$^a$ of the next subjacent plate or leaf, and so on for the series of leaves 23, 24, 25, and 26. The spring seat 27 is provided with a recess 28, which is concave to receive the corresponding convex head 29 of a bolt, the shank 30 of which extends through the alined apertures in the projections 22$^a$—26$^a$. The end of the bolt is provided with a nut 31. The construction above described provides a convenient manner of assembling the spring for shipment and, in this embodiment, when the spring is applied to its seat by means of the clips 32, the shank of the bolt is relieved of all shearing strain, such strain being transmitted downwardly through the nesting projections 22$^a$—26$^a$ to the head of the bolt 29 and through said head to the spring seat.

In Fig. 6, there is shown a modification of the invention which combines the features of construction shown in the two preceding embodiments of my invention. In this view, the spring leaves 32, 33, 34, 35 and 36 are each provided with a central projection 32$^a$—36$^a$, adapted to nest one within the other, the projections extending away from the spring seat 37. These projections are provided with alined apertures for the reception of the bolt, the head of which is designated by 38. This bolt head is provided with a recess on the end which is presented toward the spring seat, said recesses being adapted to receive the projection 39 on the spring seat. The opposite face of the bolt head is inclined, as shown at 40, to correspond to and fit within the recess 36$^b$ which is complementary to the projection 36$^a$ on the shortest leaf of the spring. The shank 41 of the bolt extends through the alined apertures in the projections 32$^a$—36$^a$ and is provided with a nut 41$^a$. Suitable clips 37$^a$ are provided for securing the spring to the seat. The bolt in this embodiment of my invention serves the same function as the bolt shown in Figs. 4 and 5, namely; to assemble the spring for shipment and to assist in transmitting the shear of the spring leaves to the spring seat.

In Figs. 7 and 8, there is shown a modification of my invention which resembles the embodiment shown in Figs. 4 and 5, except that the projections on the spring leaves are directed toward the spring seat instead of away from it and the spring seat is provided with a recess adapted to receive the projection on the short leaf or plate. In this modification, 42 denotes the main plate, said plate being provided with a central projection 42$^a$ with a complementary recess 42$^b$ and a central aperture 42$^c$. Each of the other leaves 43, 44, 45 and 46 is provided with a similar projection and recess, whereby the projection on each longer leaf may rest within the recess of the next shorter leaf. 47 denotes the spring seat, which is similar to the seat shown in the preceding figures except that it is provided with a recess 47$^a$ for the projection 46$^a$ and the seat is of sufficient thickness to provide for a small recess 47$^b$ for the accommodation of the end of the bolt which serves to center the spring leaves together for shipment. This bolt is shown as provided with a head 48 conforming to the recess 42$^b$ and with a shank 49 extending through the alined apertures in the projections 42$^a$—46$^a$. At its end it is provided with a nut 50, which is shown within the recess 47$^b$. Clips 51 are provided for securing the spring to the spring seat 47. The construction described relieves the shank 49 of the bolt of all shear and, in fact, said bolt may be dispensed with entirely and the clips 51 will suffice to secure the spring leaves together and to the seat.

In Figs. 9, 10 and 11, there is illustrated a modification of my invention which differs from that shown in Figs. 7 and 8 chiefly in the employment of a modified form of bolt. The bolt in this instance is of the flat type, having an elongated T head and a flat shank. The main leaf 52 is provided with a central projection 52$^a$ which is elongated and is shaped to conform to the head of the bolt. 52$^b$ denotes the recess which is complementary to the projection 52$^a$, and 52$^c$ the central aperture through said projection. The other plates are shown at 53, 54, 55 and 56, and each is provided with a central projection 53$^a$—56$^a$, each projection having a central aperture therethrough and the apertures being alined to receive the shank of the bolt. 57 denotes the spring seat, and this seat is provided with a central recess having an inclined surface 57$^a$ complementary to the corresponding inclined surface on the projection 56 of the short leaf or plate next adjacent thereto. The spring seat is also provided with a small recess 57$^b$ for the reception of the end of the bolt. The bolt referred to is provided with a head 58, which is elongated and is provided with inclined surfaces 59 on the underside thereof adapted to engage the inclined surfaces of the recess 52$^b$. The shank 60 of the bolt projects through the alined apertures in the projections 52$^a$—56$^a$. Clips 61 serve to connect the spring to the seat and, as is the case with the spring shown in Figs. 7 and 8, the bolt is employed mainly for the purpose of assembling the spring for shipment. Should the bolt be left in place when the spring is clipped to the seat, all shearing strain will be taken off the shank of the bolt by means of the nesting projections 52ª—56ª and the inclined seat 57ª which is provided on the spring seat.

A great advantage of the construction shown herein is that they all reduce the tendency of the spring leaves to break at the center, which tendency exists to a marked degree when the clips become worn or get loose. The projections at the center of the leaves prevent breaking at this point, notwithstanding the fact that the leaves are there perforated. The form shown in Figs. 9 and 10 is particularly efficient in this regard.

Having thus described my invention, what I claim is:

1. The combination, with a multiple leaf spring having leaves provided each with a central projection within the lateral edges thereof and a complementary recess, whereby said leaves may be centered with the projection of one leaf nesting within the recess of an adjacent leaf, of a spring seat having a surface conforming to the deflected portion of the adjacent spring leaf, and clips securing said spring to the seat.

2. A multiple leaf spring having a plurality of leaves each of which has at its central portion and within the confines of the lateral edges thereof a projection with a complementary recess and a central aperture, and a bolt extending through said apertures and having a head conforming in shape to a recess in the outer leaf of the spring.

3. A multiple leaf spring having a plurality of leaves each of which has at its central portion and within the confines of the lateral edges thereof a projection with a complementary recess and a central aperture, and a bolt extending through said apertures.

In testimony whereof, I hereunto affix my signature in the presence of two witnesses.

MICHAEL M. McINTYRE.

Witnesses:
J. B. HULL,
BRENNAN B. WEST.

Copies of this patent may be obtained for five cents each, by addressing the "Commissioner of Patents, Washington, D. C."